(12) United States Patent
Churchwell, II et al.

(10) Patent No.: US 10,239,478 B2
(45) Date of Patent: Mar. 26, 2019

(54) FOUR-QUADRANT PROTECTIVE DENT SHIELD SYSTEM

(71) Applicant: FORD GLOBAL TECHNOLOGIES, LLC, Dearborn, MI (US)

(72) Inventors: Howard E. Churchwell, II, Monroe, MI (US); John W. Jensen, Canton, MI (US); Mahmoud Yousef Ghannam, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 58 days.

(21) Appl. No.: 15/474,220

(22) Filed: Mar. 30, 2017

(65) Prior Publication Data

US 2018/0281717 A1   Oct. 4, 2018

(51) Int. Cl.
*B60R 19/02* (2006.01)
*B60R 19/40* (2006.01)
*B60R 19/42* (2006.01)
*B60R 13/04* (2006.01)
*B60R 19/03* (2006.01)
*B60R 19/44* (2006.01)

(52) U.S. Cl.
CPC .............. *B60R 19/40* (2013.01); *B60R 13/04* (2013.01); *B60R 19/023* (2013.01); *B60R 19/03* (2013.01); *B60R 19/42* (2013.01); *B60R 19/44* (2013.01)

(58) Field of Classification Search
CPC .......... B60R 3/002; B60R 19/42; B60R 3/02; B60R 19/38; B60R 13/04; B60R 19/02; B60R 19/023; B60R 19/48
USPC ....... 293/128, 118, 127, 126, 109, 48, 9, 21; 296/187.12, 146.9, 193.05, 128; 417/480, 417/490, 507, 560
See application file for complete search history.

(56) References Cited

U.S. PATENT DOCUMENTS

| 3,563,594 A | * | 2/1971 | London | B60J 11/025 |
| | | | | 105/324 |
| 3,718,357 A | | 2/1973 | Hertzell | |
| 4,217,715 A | | 8/1980 | Bryan, Jr. | |
| 4,958,881 A | * | 9/1990 | Piros | B60J 11/02 |
| | | | | 160/370.22 |

(Continued)

FOREIGN PATENT DOCUMENTS

| CN | 102555963 A | 7/2012 |
| EP | 1445151 A1 | 8/2004 |

(Continued)

OTHER PUBLICATIONS

Non-Final Office Action dated Jul. 28, 2017 for U.S. Appl. No. 15/440,717, filed Feb. 23, 2017.

(Continued)

*Primary Examiner* — D Glenn Dayoan
*Assistant Examiner* — Sunsurraye Westbrook
(74) *Attorney, Agent, or Firm* — Jason Rogers; Vichit Chea; King & Schickli PLLC

(57) ABSTRACT

A deployable dent shield assembly for a vehicle includes a deployable dent shield element adapted for translation between a stowed position comprising a coiled configuration disposed below a vehicle element and a deployed position overlaying at least a portion of a vehicle door and/or fender. The dent shield assemblies may be manually-operated or power-operated.

20 Claims, 4 Drawing Sheets

(56) References Cited

U.S. PATENT DOCUMENTS

| | | | |
|---|---|---|---|
| 5,022,700 A * | 6/1991 | Fasiska | B60J 11/02 160/26 |
| 5,131,703 A | 7/1992 | Stirling | |
| 5,358,268 A | 10/1994 | Hawkins | |
| 5,601,300 A | 2/1997 | Fink et al. | |
| 6,536,790 B1 | 3/2003 | Ojanen | |
| 6,955,370 B2 | 10/2005 | Fabiano et al. | |
| 6,964,446 B2 * | 11/2005 | Porter | B60J 11/02 150/166 |
| 7,077,440 B1 | 7/2006 | Morales et al. | |
| 7,287,771 B2 | 10/2007 | Lee et al. | |
| 7,318,596 B2 | 1/2008 | Scheuring, III et al. | |
| 7,354,083 B1 | 4/2008 | Obermann | |
| 7,377,531 B2 | 5/2008 | Fabiano et al. | |
| 7,464,982 B1 * | 12/2008 | Lin | B60J 11/02 296/136.01 |
| 8,146,935 B1 | 4/2012 | Adams | |
| 8,235,432 B2 | 8/2012 | Ryan et al. | |
| 8,262,113 B1 | 9/2012 | Chafey et al. | |
| 8,590,951 B1 | 11/2013 | Calabro | |
| 9,180,824 B1 | 11/2015 | Rodriguez et al. | |
| 9,308,880 B1 | 4/2016 | Johnson | |
| 2003/0006575 A1 | 1/2003 | Genis et al. | |
| 2004/0108678 A1 | 6/2004 | Berkebile et al. | |
| 2006/0175791 A1 | 8/2006 | Kaempe | |
| 2007/0228748 A1 | 10/2007 | Ryan et al. | |
| 2008/0252034 A1 | 10/2008 | Duncan | |
| 2009/0184485 A1 | 7/2009 | Castillo et al. | |
| 2010/0194070 A1 | 8/2010 | Stauffer et al. | |
| 2011/0221212 A1 * | 9/2011 | Sturdee | B60J 11/00 293/127 |
| 2015/0291116 A1 | 10/2015 | Pi | |
| 2017/0190308 A1 | 7/2017 | Smith et al. | |

FOREIGN PATENT DOCUMENTS

| | | |
|---|---|---|
| GB | 2535991 A | 9/2016 |
| JP | 4647805 B2 | 12/2010 |
| KR | 100976996 B1 | 8/2010 |
| WO | 200253416 A2 | 7/2002 |

OTHER PUBLICATIONS

Final Office Action dated Feb. 7, 2018 for U.S. Appl. No. 15/440,717, filed Feb. 23, 2017.

Non-Final Office Action dated Jul. 31, 2017 for U.S. Appl. No. 15/335,630, filed Oct. 27, 2016.

Final Office Action dated Feb. 5, 2018 for U.S. Appl. No. 15/335,630, filed Oct. 27, 2016.

English Machine Translation of JP4647805B2.

English Machine Translation of CN102555963A.

English Machine Translation of KR100976996B1.

314 Engineering Co. Ltd., Automatic Car Door Protection at the Touch of a Button, https://www.crowdfunder.com/autoblocksystem, Nov. 2, 2016, pp. 3 of 3.

* cited by examiner

US 10,239,478 B2

FOUR-QUADRANT PROTECTIVE DENT SHIELD SYSTEM

TECHNICAL FIELD

The present disclosure generally relates to a body protection system for a vehicle. More specifically, the present disclosure relates to a deployable dent shield for a vehicle.

BACKGROUND

Modern vehicle styling generally has removed the protective bumper that protected the passenger doors and other side panels of older vehicle models from dings and scrapes. In the past, rubber, plastic, or other material door bumpers were often affixed to the outer surface of the passenger doors and/or fenders. Newer vehicle styling typically omits such protection, making door dings, scratches, and paint transfers more common. The typical cost of such repairs is often covered solely by the vehicle owner, increasing the cost of ownership and frustration levels of modern vehicle consumers.

To solve this and other problems, the present disclosure relates to a four-quadrant protective assembly comprising a deployable protective dent shield. When not required, the protective assembly is held in a stowed position, whereby the outward appearance and styling of the vehicle are not affected.

SUMMARY

In accordance with the purposes and benefits described herein, in one aspect of the present disclosure a deployable dent shield assembly for a vehicle is provided, comprising a deployable dent shield element adapted for translation between a stowed position and a deployed position overlaying at least a portion of a vehicle side. The stowed position comprises a coiled configuration disposed below a vehicle element. In embodiments, the vehicle element may be one of a vehicle bumper, a vehicle fascia panel, a vehicle fender wall, or a vehicle outer panel member. The system may further include a deployable dent shield element actuator.

The deployable dent shield element may comprise deployable elongate dent shield strips. In embodiments, the deployable elongate dent shield strips may each be stowed in a coiled configuration disposed substantially at a separate one of four vehicle corner positions. In alternative embodiments, the deployable elongate dent shield strips may be stowed in a coiled configuration disposed substantially at a vehicle forward and/or a vehicle rearward position as oppositely coiled elongate dent shield strips configured to deploy in opposite directions. In yet other alternative embodiments, the deployable elongate dent shield strips may be stowed in a coiled configuration disposed substantially at a vehicle side or at opposed vehicle sides as oppositely coiled elongate dent shield strips configured to deploy in opposite directions.

In another aspect, a deployable dent shield system for a vehicle is provided, comprising a plurality of deployable elongate dent shield strips each adapted for translation between a stowed position disposed below one of a vehicle bumper, a vehicle fascia panel, a vehicle fender wall, or a vehicle outer panel member and a deployed position overlaying at least a portion of a vehicle side. The system further comprises an actuator for causing the translation between the stowed position and the deployed position.

In manually operable embodiments, the actuator comprises a grab handle associated with each of the plurality of deployable elongate dent shield strips. In power-operated embodiments, the actuator comprises a controller configured to apply a shape-changing stimulus to the material of the plurality of deployable elongate dent shield strips. The actuator further comprises one or more motors adapted to translate the plurality of deployable elongate dent shield strips between the stowed position and the deployed position. The plurality of deployable elongate dent shield strips may be substantially as described above.

In embodiments, the deployable elongate dent shield strips may be stowed in a coiled configuration disposed substantially at a separate one of four vehicle corner positions. In alternative embodiments, the deployable dent shield members may be provided each including a pair of oppositely coiled elongate dent shield strips configured to deploy in opposite directions. The two deployable dent shield members may be stowed disposed substantially at a vehicle side or at opposed vehicle sides and below a vehicle side-mounted structure or may be stowed disposed substantially at one or both vehicle ends and below a vehicle fascia panel.

In yet another aspect of the disclosure, a deployable dent shield system for a vehicle is provided, comprising a plurality of deployable elongate dent shield strips each adapted for translation between a coiled stowed position and a deployed position overlaying at least a portion of a vehicle side and an actuator for causing the translation between the stowed position and the deployed position. In one possible embodiment, the actuator comprises a grab handle associated with each of the plurality of deployable elongate dent shield strips.

In another possible embodiment, the plurality of deployable elongate dent shield strips are fabricated of a shape memory polymer, of a shape memory alloy, or of a polymer comprising a shape memory alloy. In these embodiments, the actuator may comprise a controller configured to apply a shape-changing stimulus to the shape memory polymer, the shape memory alloy, or the polymer comprising a shape memory alloy and one or more motors adapted to translate the plurality of deployable elongate dent shield strips between the stowed position and the deployed position. Each of the one or more motors rotationally drives a spool adapted to coil or uncoil one or more deployable elongate dent shield strips.

In the following description, there are shown and described embodiments of the disclosed four-quadrant protective deployable dent shield assembly. As it should be realized, devices and methods are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed four-quadrant protective deployable dent shield assembly, and together with the description serve to explain certain principles thereof. In the drawings.

Reference will now be made in detail to embodiments of the disclosed four-quadrant protective deployable dent shield assembly, examples of which are illustrated in the accompanying drawing figures.

DETAILED DESCRIPTION

At a high level, the present disclosure is directed to a four-quadrant protective deployable dent shield assembly comprising a plurality of elongate dent shield strips. The plurality of elongate dent shield strips are each conveniently stowed in a coiled configuration below a vehicle element when not in use. In turn, the plurality of elongate dent shield strips may be manually or automatically deployed for use to a deployed position overlaying at least a portion of a vehicle fender and/or door panel.

Figure 1:
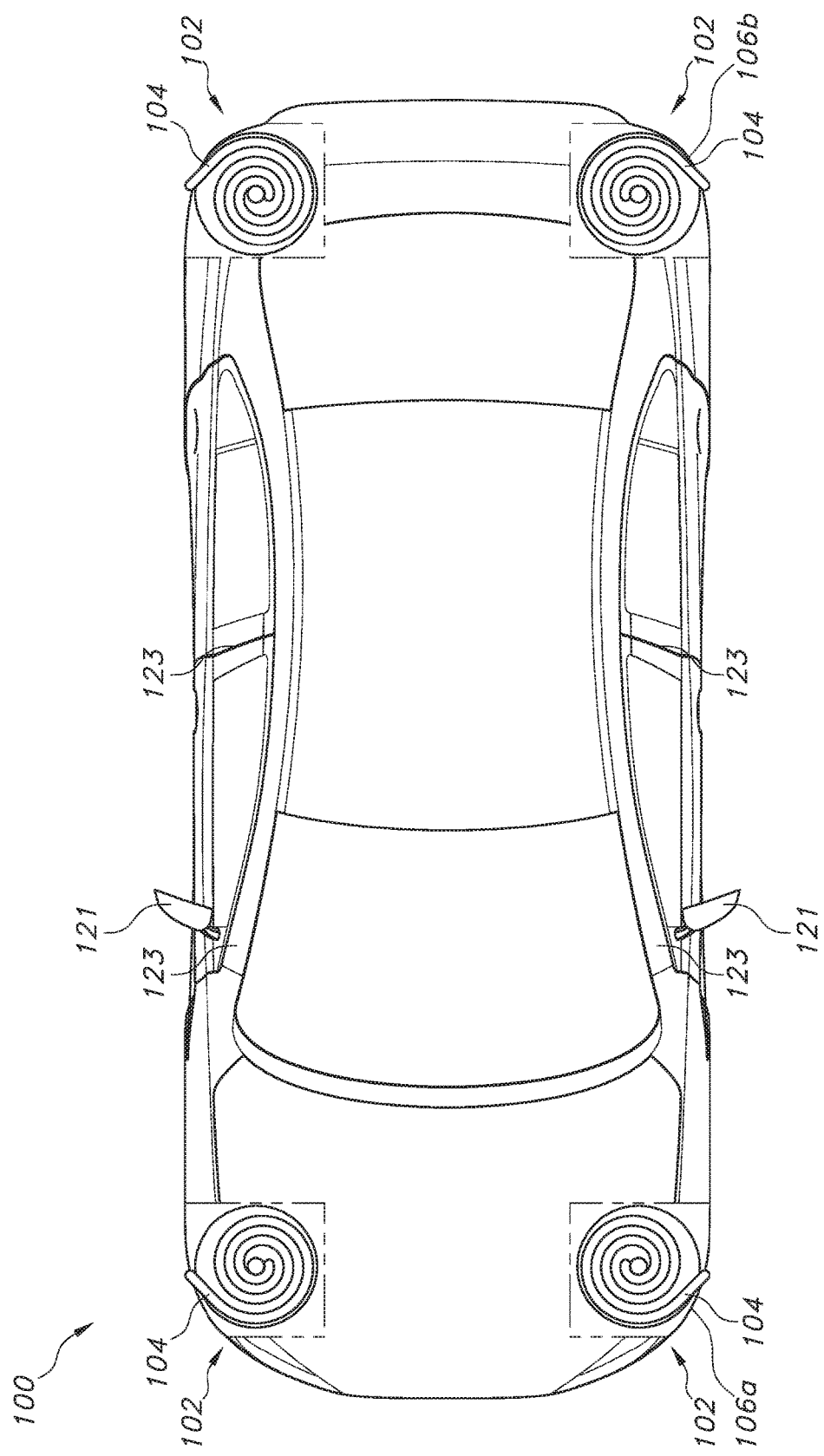
FIG. 1 shows a vehicle including a four-quadrant protective deployable dent shield assembly according to the present disclosure, held in a stowed configuration.

In more detail and with reference to FIG. 1, a motor vehicle 100 is shown including a four-quadrant protective deployable dent shield assembly 102. In the depicted embodiment, the protective deployable dent shield assembly 102 comprises elongate dent shield strips 104, shown stowed in a coiled configuration below the vehicle front and rear fascia panels 106a, 106b. In an alternative embodiment, the elongate dent shield strips 104 could be stowed below the vehicle front and rear bumpers (not shown in this view). As shown, the elongate dent shield strips 104 are respectively stowed at a corner portion of the vehicle 100 in the coiled configuration.

Figure 2:
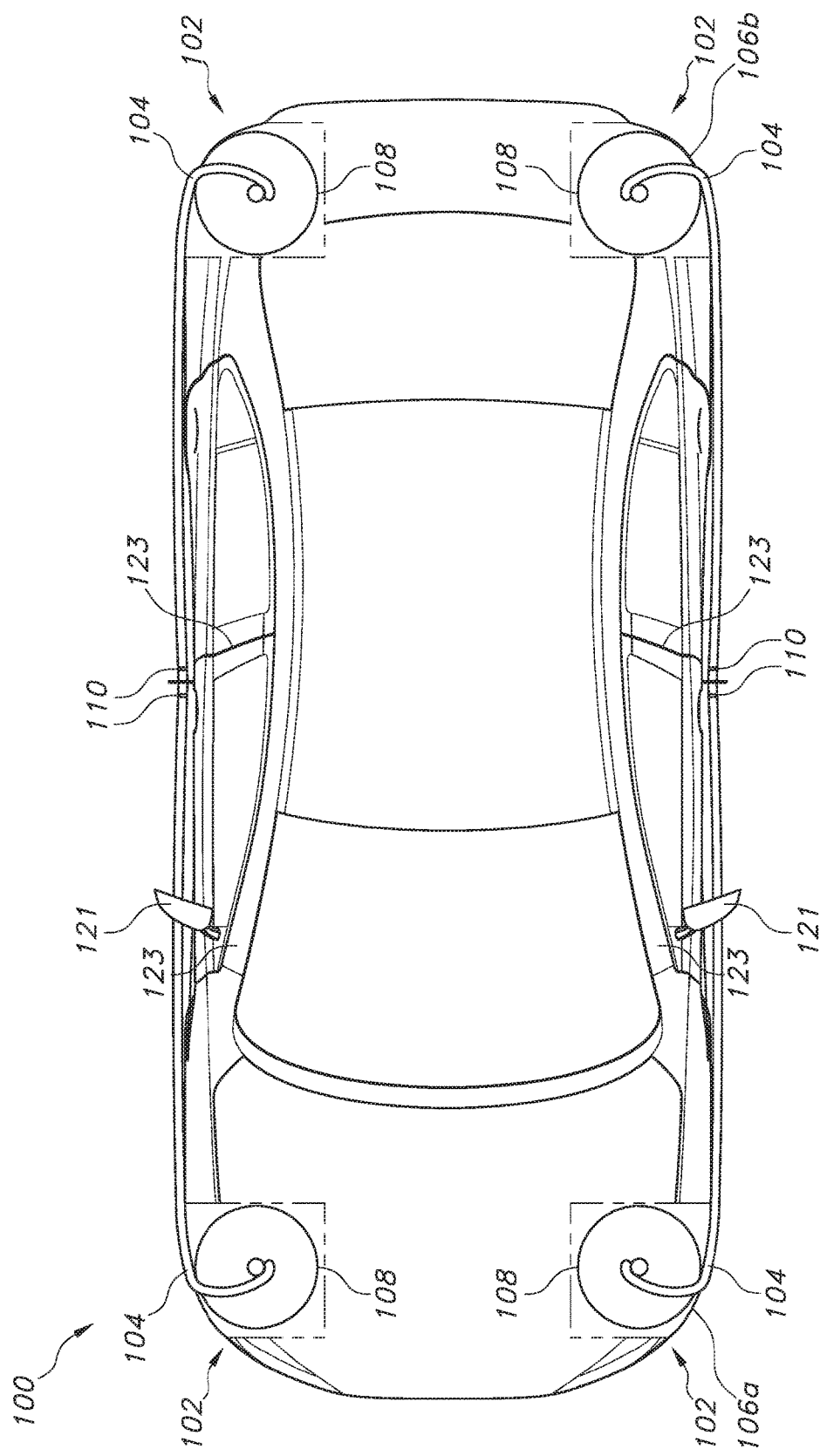
FIG. 2 illustrates a fully deployed position of the four-quadrant protective deployable dent shield assembly of FIG. 1.

The elongate dent shield strips 104 are stowed coiled on one or more rotating spools 108 as shown in FIG. 2, and may be deployed manually or automatically as will be described. In the depicted embodiment, a manually actuated system is shown wherein a user may grasp grab handles 110 disposed on an end of the elongate dent shield strips 104 and withdraw them from their stowed position, such as through an aperture (not visible in this view) in the vehicle fender walls 112. The grab handles 110 may be adapted to attach to one another to retain the elongate dent shield strips in the deployed configuration, or may attach to structures provided on the vehicle 100. Suitable mechanisms are provided for retraction of the elongate dent shield strips 104 to the stowed positions shown in the drawing. For example, the rotating spools 108 may be provided with suitable biasing members such as coil or torsion springs which bias the spools to rotate in a direction whereby the elongate dent shield strips 104 can be retracted to the stowed position on release of the attachment structures described above.

Figure 3:
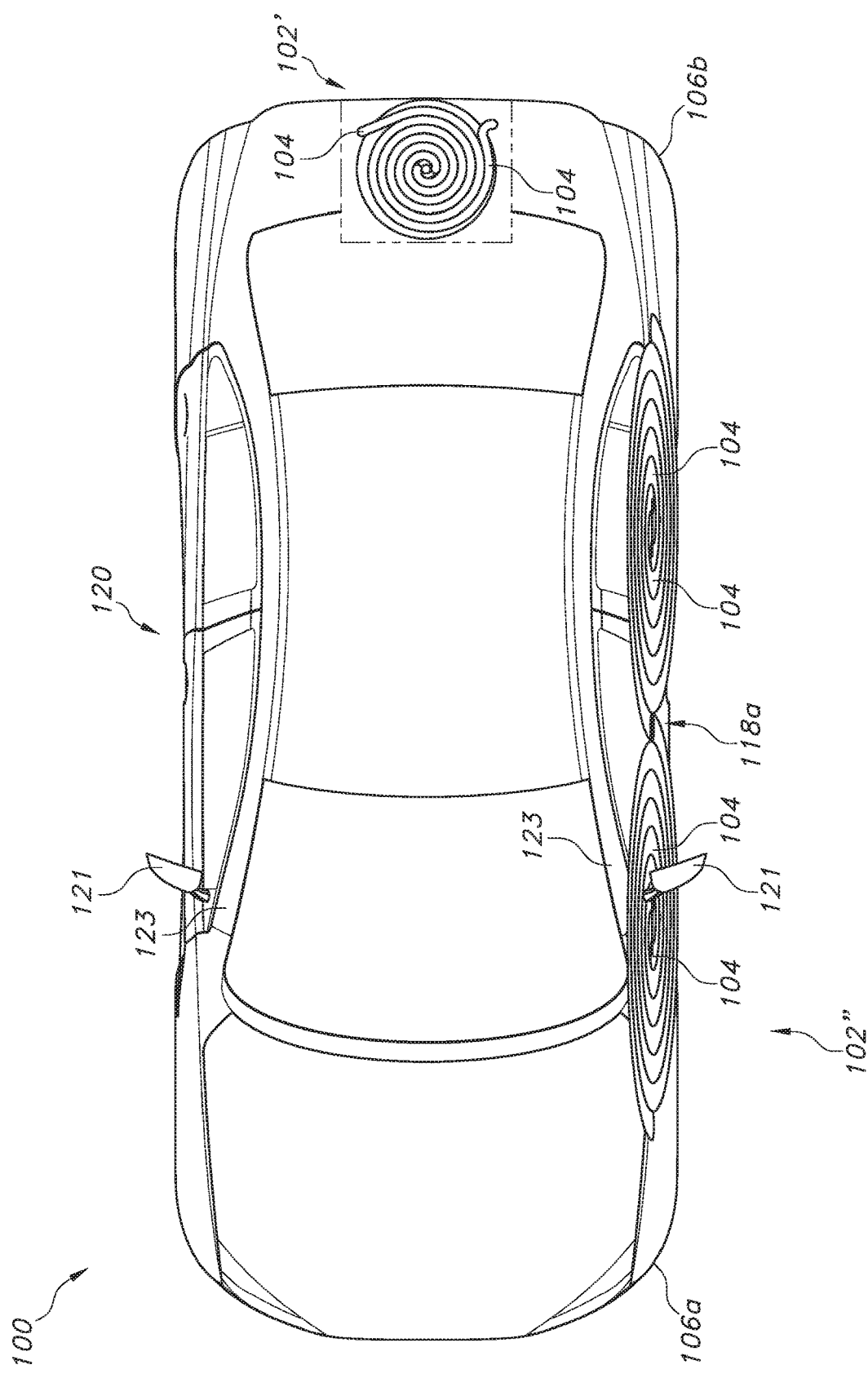
FIG. 3 shows alternative embodiments for the four-quadrant protective deployable dent shield assembly of FIG. 1.

In alternative embodiments, the protective deployable dent shield assembly 102 comprising elongate dent shield strips 104 may be stowed at alternative vehicle 100 locations. For example, FIG. 3 shows a protective deployable dent shield assembly 102' wherein the elongate dent shield strips 104 are stowed at a vehicle rear-most portion 114, again below the fascia 106b. A similar embodiment (not shown) includes the elongate dent shield strips 104 stowed at a vehicle front-most portion 116 below the fascia 106a. As shown, the elongate dent shield strips 104 are oppositely coiled on a spool 108 (not visible in this view) whereby rotating the spool in a first direction will cause the elongate dent shield strips 104 to deploy in opposite directions, thereby allowing the elongate dent shield strips to cover a portion of both opposed vehicle fenders/door panels to protect against dings and scrapes. Alternatively, a pair of such oppositely coiled elongate dent shield strip 104 assemblies may be provided disposed at each of the vehicle front 116 and rear 114 (embodiment not shown). In turn, rotating the spool 108 in the opposed direction will retract the elongate dent shield strips 104 to the stowed position shown in the drawing.

In yet another embodiment depicted in FIG. 3, a protective deployable dent shield assembly 102" is shown wherein the elongate dent shield strips 104 are stowed at one or both vehicle 100 sides 118, 120. The deployable dent shield assembly 102" may comprise a plurality of elongate dent shield strips 104 oppositely coiled on a spool 108 (not visible in this view) as described above. Alternatively, a pair of such oppositely coiled elongate dent shield strip 104 assemblies may be provided disposed at each of the vehicle sides 118, 120 (embodiment not shown). The oppositely coiled elongate dent shield strip 104 assembly(s) may be adapted to deploy from a vehicle side-mounted structure, such as an aperture provided in a vehicle side mirror 121 housing or a vehicle pillar structure 123 such as the vehicle A-pillar.

Any suitably flexible but impact-resistant material is contemplated for use in fabricating the elongate dent shield strips 104, including without intending any limitation rubber or rubber-like materials (such as those marketed under the trade name TANGOGRAY FLX950, TANGOBLACK FLX973, TANGOPLUS FLX930, TANGOBLACKPLUS FLX980, and others), or such materials over-molded over thin sheet metal or wire structures.

In addition to the manually operated embodiments described above, it is contemplated to provide power-operated protective deployable dent shield assemblies 102. In such embodiments, it is contemplated to provide elongate dent shield strips 104 fabricated of or comprising a suitable shape memory material, such as a shape memory alloy, a shape memory polymer, a suitably flexible and cushioning material as described above comprising a shape memory alloy or a shape memory polymer, and others. The elongate dent shield strips 104 may be fabricated to assume suitable circular (in cross-section) or cylindrical shapes to allow support of the cantilevered weight of the strips during deployment.

As is known, shape memory materials can retain two or more shapes, with the transition between a temporary form or shape and a "stored" form or shape being induced by a stimulus such as temperature, electric or magnetic stimuli, light, and others. At a high level, such materials are manufactured and then transitioned into the temporary form by various stimuli such as heating, deformation, and cooling. The shape memory material will retain this temporary form or shape until a suitable external stimulus is applied, at which time the material will transition back to recover its stored form or shape.

Advantageously, the ability of a shape memory material to assume both a temporary and a stored configuration or shape provides a convenient system for transitioning elongate dent shield strips 104 fabricated of or comprising such materials between the stowed and deployed positions described above. For example, each elongate dent shield strip 104 may be configured whereby its stored configuration is substantially the deployed configuration described above and its temporary configuration is substantially the stowed configuration described above. When it is desired to deploy the elongate dent shield strips 104, a suitable external stimulus is provided which causes the materials of the strips to transition to the stored configuration, i.e. the deployed position shown in the drawing figures.

Figure 4:
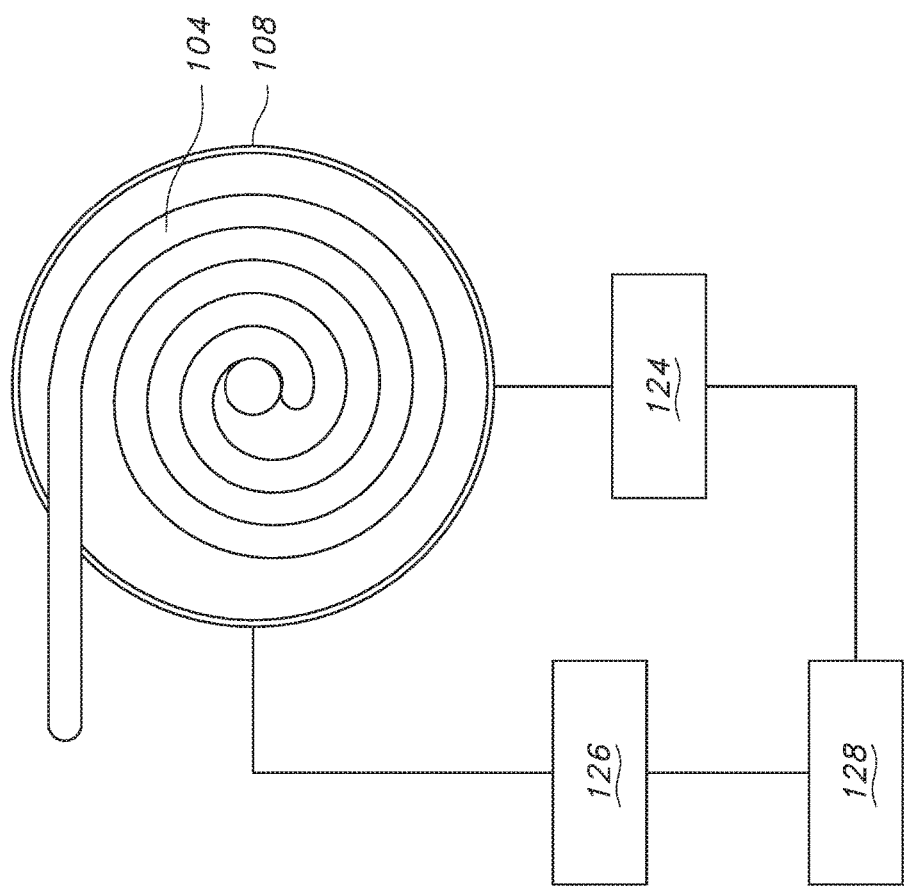
FIG. 4 shows an actuator system for the four-quadrant protective deployable dent shield assembly according to the present disclosure.

For such power-operated protective deployable dent shield assemblies 102, it is contemplated to provide an actuator assembly 122 adapted to cause the elongate dent shield strips 104 to translate between the stowed and deployed positions. In one possible embodiment shown in FIG. 4, deployable dent shield assemblies 102 as described above are provided, including elongate dent shield strips 104 disposed on spools 108. Each spool 108 may be driven by one or more motors 124, and further may be provided with one or more position sensors (not shown) such as Hall effect sensors to determine a number of rotations of the spool and thereby the degree of deployment/retraction of the elongate dent shield strip(s) 104 carried thereon.

In turn, the actuator assembly 122 may comprise an activation device 126 adapted to selectively provide a suitable external stimulus to the shape memory material comprising the elongate dent shield strip(s) 104. As described, this could be an electrical field or impulse generator, a heating element, or other device providing a suitable external stimulus according to the shape memory material of which the elongate dent shield strip 104 is comprised.

The actuator assembly 122 is further provided with a controller module 128. This may be one or more controllers working in concert, for example one or more dedicated Electronic Control Units (ECU), a central controller such as the vehicle 100 Body Control Module (BCM), or combinations. By the controller module 128, the actuator assembly 122 is caused to deploy/retract the deployable dent shield assemblies 102. A user may as needed actuate the controller module 128/actuator assembly 122 to deploy or retract the protective deployable dent shield assemblies 102 by a variety of known mechanisms, including a human-machine interface (HMI), one or more interior or exteriorly disposed switches, and one or more remoted devices such as key fobs, passive entry/passive start devices such as smartkeys, mobile devices configured with phone-as-a-key logic, and others.

As will be appreciated, the above-described systems provide a convenient, effective system for protecting against dings and scrapes to a vehicle 100 so equipped. In use, a user simply parks the vehicle at its destination, for example at a shopping center parking lot, and exits the vehicle. Once the vehicle 100 is unoccupied, the protective deployable dent shield assemblies 102 can be deployed manually or via the actuator assembly 122 as described above to protect the vehicle. When the user and/or other passengers return to the vehicle 100, the protective deployable dent shield assemblies 102 can be retracted manually or via the actuator assembly 122 to restore the vehicle to its original outward appearance/styling.

Obvious modifications and variations are possible in light of the above teachings. All such modifications and variations are within the scope of the appended claims when interpreted in accordance with the breadth to which they are fairly, legally and equitably entitled.

What is claimed:

1. A deployable dent shield assembly for a vehicle, comprising a deployable dent shield element adapted for translation between a stowed position comprising a coiled configuration disposed below a vehicle element and a deployed position overlaying at least a portion of a vehicle door and/or fender; wherein the vehicle element is one of a vehicle bumper, a vehicle fascia panel, a vehicle fender wall, a vehicle side mirror, or a vehicle pillar member.

2. The deployable dent shield assembly of claim 1, wherein the deployable dent shield element comprises a plurality of deployable elongate dent shield strips.

3. The deployable dent shield assembly of claim 2, wherein the plurality of deployable elongate dent shield strips are each stowed in a coiled configuration disposed substantially at a separate one of four vehicle corner positions.

4. The deployable dent shield assembly of claim 2, wherein the plurality of deployable elongate dent shield strips are stowed in a coiled configuration disposed substantially at a vehicle-forward and/or a vehicle-rearward position.

5. The deployable dent shield assembly of claim 4, wherein the coiled configuration comprises oppositely coiled elongate dent shield strips configured to deploy in opposite directions from a same spool.

6. The deployable dent shield assembly of claim 2, wherein the plurality of deployable elongate dent shield strips are stowed in a coiled configuration disposed substantially at a vehicle side or at opposed vehicle sides.

7. The deployable dent shield assembly of claim 6, wherein the coiled configuration comprises oppositely coiled elongate dent shield strips configured to deploy in opposite directions from a same spool.

8. The deployable dent shield assembly of claim 1, further including a deployable dent shield element actuator.

9. A deployable dent shield system for a vehicle, comprising:
   a plurality of deployable elongate dent shield strips each adapted for translation between a stowed position disposed beneath one of a vehicle bumper, a vehicle fascia panel, a vehicle fender wall, a vehicle side mirror, or a vehicle pillar member and a deployed position overlaying at least a portion of a vehicle door and/or fender; and
   an actuator for causing the translation between the stowed position and the deployed position.

10. The deployable dent shield system of claim 9, wherein the actuator comprises a grab handle associated with each of the plurality of deployable elongate dent shield strips.

11. The deployable dent shield system of claim 9, wherein the actuator comprises one or more motors adapted to translate the plurality of deployable elongate dent shield strips between the stowed position and the deployed position and a controller configured to apply a shape-changing stimulus to the material of the plurality of deployable elongate dent shield strips.

12. The deployable dent shield system of claim 9, comprising the plurality of deployable elongate dent shield strips each one stowed in a coiled configuration disposed substantially at a separate one of four vehicle corner positions.

13. The deployable dent shield system of claim 9 comprising oppositely coiled elongate dent shield strips configured to deploy in opposite directions from a same spool.

14. The deployable dent shield system of claim 13, wherein the oppositely coiled elongate dent shield strips are stowed disposed substantially below a vehicle pillar structure.

15. The deployable dent shield system of claim 13, wherein the oppositely coiled elongate dent shield strips are stowed disposed substantially at one or both vehicle ends and below a vehicle fascia panel.

16. A deployable dent shield system for a vehicle, comprising:
   a plurality of deployable elongate dent shield strips each adapted for translation between a coiled stowed position and a deployed position overlaying at least a portion of a vehicle door and/or fender; and
   an actuator for causing the translation between the stowed position and the deployed position.

17. The deployable dent shield system of claim 16, wherein the actuator comprises a grab handle associated with each of the plurality of deployable elongate dent shield strips.

18. The deployable dent shield system of claim 16, wherein the plurality of deployable elongate dent shield strips are fabricated of a shape memory polymer, of a shape memory alloy, or of a polymer comprising a shape memory alloy.

19. The deployable dent shield system of claim 18, wherein the actuator comprises a controller configured to apply a shape-changing stimulus to the shape memory polymer or the polymer comprising a shape memory alloy and one or more motors adapted to translate the plurality of deployable elongate dent shield strips between the stowed position and the deployed position.

20. The deployable dent shield system of claim 19, wherein each of the one or more motors rotationally drives a spool adapted to coil or uncoil one or more deployable elongate dent shield strips.

* * * * *